United States Patent
Cui et al.

(10) Patent No.: US 12,318,948 B2
(45) Date of Patent: Jun. 3, 2025

(54) SYSTEM AND METHOD FOR AUTOMATED OPERATION AND MAINTENANCE OF A ROBOT SYSTEM

(71) Applicant: AT&T Intellectual Property I, L.P., Atlanta, GA (US)

(72) Inventors: Zhi Cui, Sugar Hill, GA (US); Paul Edward Smith, Jr., Heath, TX (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

(21) Appl. No.: 17/991,963

(22) Filed: Nov. 22, 2022

(65) Prior Publication Data

US 2024/0165815 A1 May 23, 2024

(51) Int. Cl.
*G06F 17/00* (2019.01)
*B25J 9/16* (2006.01)

(52) U.S. Cl.
CPC ........... *B25J 9/1689* (2013.01); *B25J 9/1674* (2013.01); *G05B 2219/39001* (2013.01)

(58) Field of Classification Search
CPC ................. B25J 9/1689; B25J 9/1674; G05B 2219/39001; G05B 2219/39413
USPC ...................................................... 700/264
See application file for complete search history.

(56) References Cited

U.S. PATENT DOCUMENTS

| | | | | |
|---|---|---|---|---|
| 7,343,222 | B2 * | 3/2008 | Solomon | G05D 1/0088 901/1 |
| 8,112,176 | B2 * | 2/2012 | Solomon | G05D 1/0088 318/16 |
| 8,886,390 | B2 * | 11/2014 | Wolfe | G05B 19/41895 701/1 |
| 9,223,313 | B2 * | 12/2015 | Wolfe | G16Z 99/00 |
| 10,471,594 | B2 * | 11/2019 | Bergstra | B25J 9/1656 |
| 11,327,503 | B2 * | 5/2022 | Deyle | G06V 20/58 |
| 11,345,040 | B2 * | 5/2022 | Oleynik | G05B 19/4183 |
| 11,351,680 | B1 * | 6/2022 | Rosenberg | B25J 19/0095 |
| 11,412,061 | B1 | 8/2022 | Guo et al. | |
| 2005/0287038 | A1 | 12/2005 | Dubrovsky et al. | |

(Continued)

FOREIGN PATENT DOCUMENTS

WO 2007015206 A3 10/2007

OTHER PUBLICATIONS

Smart Society and Artificial Intelligence: Big Data Scheduling and the Global Standard Method Applied to Smart Maintenance (Year: 2020).*

*Primary Examiner* — Ronnie M Mancho
(74) *Attorney, Agent, or Firm* — Guntin & Gust, PLC; Louis Yang

(57) ABSTRACT

Aspects of the subject disclosure may include, for example, determining, by a robot of a group of robots, a condition of the robot to obtain a determined result. A corrective plan is identified responsive to the determined result indicating a deficiency and a determination is made as to whether the robot is configured to perform the corrective plan. The corrective plan is executed responsive to a determination that the robot is configured to perform the corrective plan. Alternatively, assistance of a robot controller is requested responsive to the determining indicating the robot is not configured to perform the corrective plan. The robot controller is requested to initiate performance of the corrective plan. Other embodiments are disclosed.

20 Claims, 9 Drawing Sheets

(56) References Cited

U.S. PATENT DOCUMENTS

| | | |
|---|---|---|
| 2012/0323365 A1 | 12/2012 | Taylor et al. |
| 2013/0085625 A1 | 4/2013 | Wolfe et al. |
| 2014/0365258 A1 | 12/2014 | Vestal et al. |
| 2017/0019799 A1 | 1/2017 | Djordjevic et al. |
| 2017/0123820 A1 | 5/2017 | Nishi et al. |
| 2017/0329297 A1 | 11/2017 | Gilman et al. |
| 2019/0224852 A1 | 7/2019 | Choi et al. |
| 2019/0283254 A1 | 9/2019 | Ghose et al. |
| 2019/0389064 A1 | 12/2019 | High et al. |
| 2020/0053567 A1 | 2/2020 | Monshizadeh et al. |
| 2023/0102048 A1* | 3/2023 | Cella .................. B25J 9/1661 700/248 |

* cited by examiner

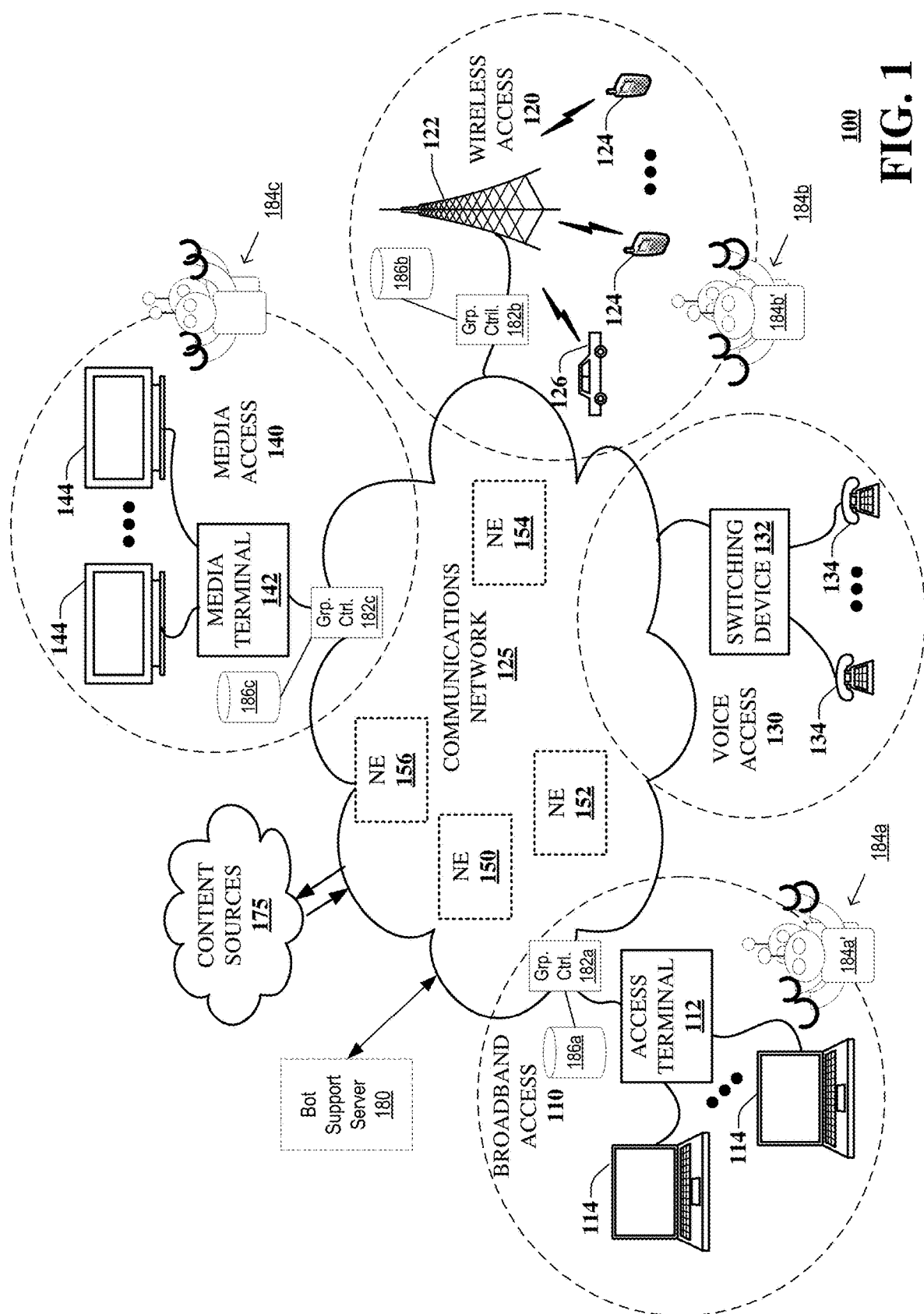

SYSTEM AND METHOD FOR AUTOMATED OPERATION AND MAINTENANCE OF A ROBOT SYSTEM

FIELD OF THE DISCLOSURE

The subject disclosure relates to a system and method for automated operation and maintenance of a robot system.

BACKGROUND

With the advent of machine learning and artificial intelligence (AI/ML), autonomous devices are expected to serve and assist consumers to many ways. For example, today autonomous devices such as robotic cleaning devices are in wide use, which enables its users to remove a common chore of vacuuming or cleaning floors. Autonomous devices are expected to eventually take on other shores such as gardening, lawn care, security monitoring, cleaning clothing and so on. The features of these autonomous devices will evolve in time whereby the learnings and skills gained by autonomous devices will serve as a valuable commodity for its consumers.

A smart home can have several devices (robots or "bots") for performing specialized tasks. Bots can be shared between smart homes (SHs) belonging to a smart community (SC). In addition, a bot can travel outside its SH and/or its SC. It is desirable that controllers for the SH/SC ensure that the bot has directions for returning, particularly when a bot moves outside the SH/SC unexpectedly and/or without authorization.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

DETAILED DESCRIPTION

Figure 2A:
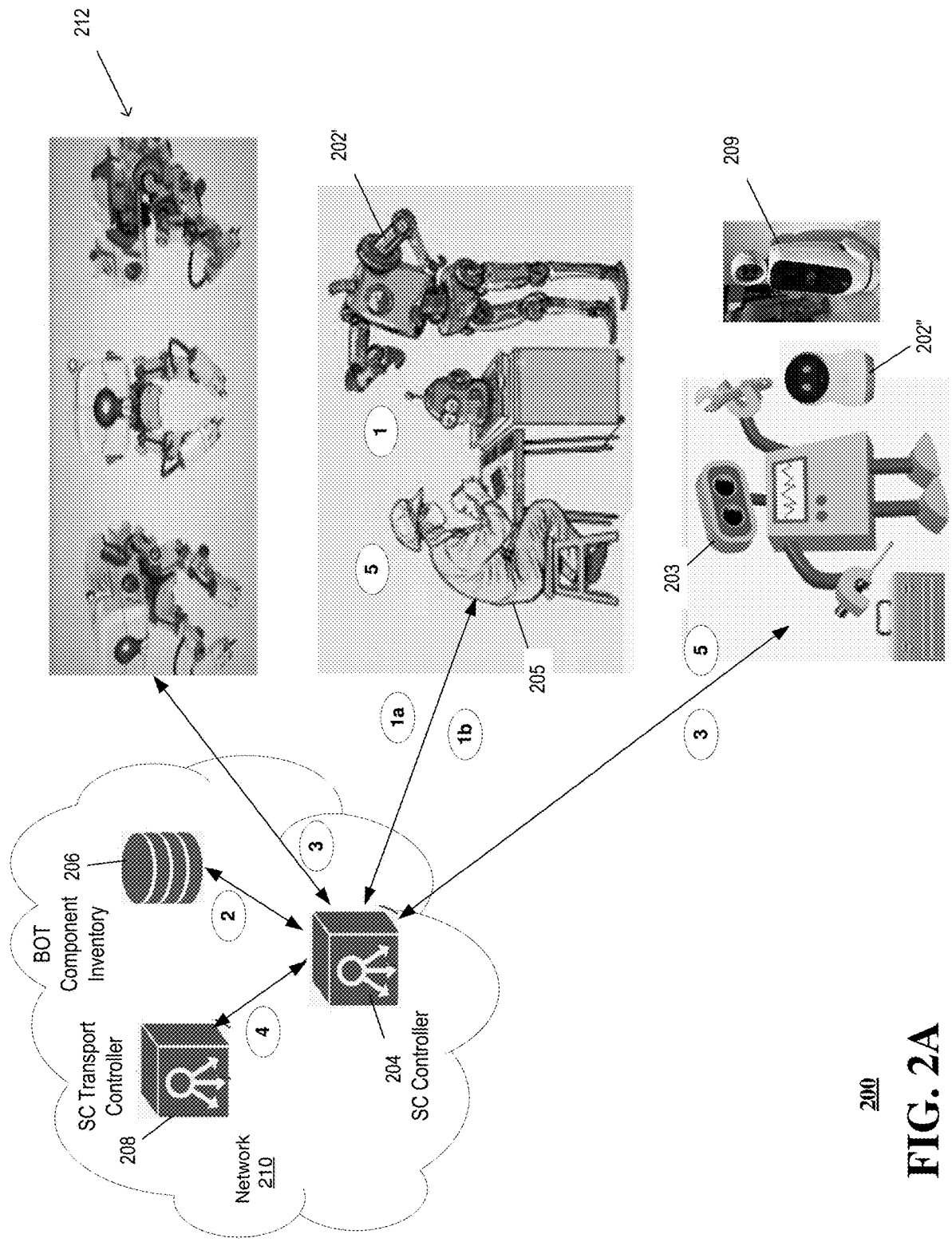
FIG. 2A is a block diagram illustrating an example, non-limiting embodiment of a robot operation and maintenance system functioning within the communication network of FIG. 1 in accordance with various aspects described herein.

The subject disclosure describes, among other things, illustrative embodiments for determining a condition of a robot to obtain a determined result and, responsive to the determined result indicating a deficiency, identifying a corrective plan. The corrective plan is executed by the robot responsive to a determination that the robot is configured to perform the corrective plan. Alternatively, responsive to the determining indicating the robot is not configured to perform the corrective plan, the assistance of a robot controller is requested to initiate performance of the corrective plan. Other embodiments are described in the subject disclosure. For example, community and/or home robots, or "bots," may be self-serviceable with compute and/or communication, e.g., wireless communications and/or networking, and/or storage capabilities to facilitate automatic repair, upgrade, reconfiguration and/or maintenance.

One or more aspects of the subject disclosure include a device, having a processing system including a processor, and a memory that stores executable instructions. Then instructions, when executed by the processing system, facilitate performance of operations that include self-evaluating, by a robot of a shared group of robots, a condition of the robot to obtain a self-evaluation result. A corrective action is identified responsive to the self-evaluation result indicating a deficiency, and a determination is made as to whether the robot is configured to perform the corrective action. The robot performs the corrective action responsive to the determining indicating the robot is configured to perform the corrective action. Alternatively, responsive to the determining indicating the robot is not configured to perform the corrective action, a message is generated that requests assistance to perform the corrective action, and the message is forwarded to a shared-robot controller, prompting the shared-robot controller to initiate performance of the corrective action.

One or more aspects of the subject disclosure include a process that includes determining, by a processing system including a processor of a robot of a shared plurality of robots, a condition of the robot to obtain an auto determined result, identifying, by the processing system, a corrective action responsive to the auto determined result indicating a deficiency. The process further includes determining, by the processing system, whether the robot is configured to perform the corrective action, and responsive to the determining indicating the robot is configured to perform the corrective action, performing, by the processing system, the corrective action. Responsive to the determining indicating the robot is not configured to perform the corrective action, a message is originated, by the processing system, that requests assistance to perform the corrective action, and the message is provided, by the processing system, to a shared-robot controller, prompting the shared-robot controller to initiate performance of the corrective action.

One or more aspects of the subject disclosure include a non-transitory, machine-readable medium, comprising executable instructions that, when executed by a processing system including a processor, facilitate performance of operations, the operations comprising: determining, by a robot of a plurality of robots, a condition of the robot to obtain a determined result; identifying a corrective plan responsive to the determined result indicating a deficiency; determining whether the robot is configured to perform the corrective plan; responsive to the determining indicating the robot is configured to perform the corrective plan, executing the corrective plan; and responsive to the determining indicating the robot is not configured to perform the corrective plan, requesting assistance of a robot controller to initiate performance of the corrective plan.

Robots may be deployed in one or more environments, such as in a home, and/or at a business, such as a farm, a manufacturing facility, a retail store, a warehouse, executive offices and the like. Other environments may include, without limitation, hospitals, schools, entertainment venues, and so on. It is envisioned that robots may be configured to operate autonomously and/or with limited external, e.g., human, direction or interaction. Robots may include one or more functions that may be directed to one or more tasks of a general and/or a specific nature. Accordingly, robots may be configured with software, such as instruction sets and/or programs that are adapted towards particular applications or tasks. Alternatively, or in addition, robots may be configured with different hardware, such as different input devices, such as cameras, video cameras, microphones, output devices, such as display screens, projectors, speakers, transport devices, such as wheels, treads, propellers, and/or environmental manipulating devices, such as robotic arms, forklifts, and so on.

It is expected that many, if not most, robots may include sophisticated software and/or hardware configured to perform robotic tasks within their intended operational environments. In at least some environments, the robots may provide direct assistance to humans who are not necessarily trained in the operation and/or maintenance of such systems. That is, the operational environments into which robots may be deployed may not have access to experienced robot operators. As technical systems with a high level of sophistication, and at times operating in harsh environments, it is understood that the robots may encounter situations and or experiences, which they may not be equipped to respond to.

It is also understood that at least some robots may require a substantial capital investment in one or more of robot resources, training, support systems, storage facilities, and so on. As with any complex software, electrical and/or mechanical system, it is understood that at least some level of ongoing support may be required in the form of operational support, help desk support, preventative maintenance, repair and so on, may also be required. In view of such investments and/or ongoing operational costs, it is advantageous to increase utilization of the robot, and in at least some instances, to maximize such utilization. At least one approach includes sharing robot resources. Sharing may be accomplished within one location, e.g., a home, by increasing and/or expanding the number of tasks a robot may perform. Thus, instead of specialized robot adapted for one purpose, e.g., vacuuming, may be configured to perform multiple services, such as vacuuming, mopping, dusting, general household organization, and so on. Alternatively, or in addition, sharing robot resources may be accomplished at a larger scale, e.g., shared among households and/or members of a community. In these instances, the robot may perform a specialized task and/or limited group of tasks but be shared so as to increase utilization.

The techniques disclosed herein promote greater robot utilization by providing an operation and maintenance (O&M) support infrastructure. Community and/or home robots, or BOTs, may be self-serviceable with compute and/or communication (networking), and/or storage capabilities to facilitate automatic repair, upgrade and/or maintenance. Diagnostic procedures may be applied to evaluate a health, operational status, and/or configuration of one or more robots. To the extent maintenance and/or repair may be necessary, corrective actions may be scheduled and/or otherwise initiated expeditiously. To the extent reconfiguration and/or replacement of a robot and/or a robot component may be necessary, the O&M support infrastructure may schedule and/or otherwise initiate such actions. For example, a shared robot configured for performing one task may require hardware and/or software reconfigurations to perform a different task. A robot scheduler may coordinate such sharing activities, by coordinating times, locations and/or tasks for one or more robots. The robot scheduler may coordinate with the O&M support infrastructure to request, schedule and/or otherwise initiate activities, such as robot transport, test and/or reconfiguration. Additional details and examples are discussed below.

Referring now to FIG. 1, a block diagram is shown illustrating an example, non-limiting embodiment of a system 100 in accordance with various aspects described herein. For example, system 100 can facilitate in whole or in part determining a condition of a robot to obtain a determined result and, responsive to the determined result indicating a deficiency, identifying a corrective plan. The corrective plan is executed by the robot responsive to a determination that the robot is configured to perform the corrective plan. Alternatively, responsive to the determining indicating the robot is not configured to perform the corrective plan, the assistance of a robot controller is requested to initiate performance of the corrective plan. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The illustrative example includes a bot support server 180 and a first group of robots 184a in cabled and/or wireless communication with one or more of the access terminal 112 and/or the data terminal 114. The first group of bots 184 may be in further communication with the communications network 125 via the broadband access 110. For example, one or more of the first group of bots 184 may be in communication with the bot support server 180 via the communications network 125. In at least some embodiments, the bot support server 180 may be configured to perform one or more bot support services, such as bot testing, bot tracking, bot configuration, bot repair and/or replacement, bot upgrade, and the like. Alternatively, or in addition, the bot support server 180 may coordinate one or more aspects of bot sharing, such as bot location, bot affiliation, bot configuration, bot scheduling, and so on. In at least some embodiments, one or more aspects of bot sharing may be delegated to a separate bot sharing server (not shown).

It is envisioned that in at least some instances, low latency may be beneficial to bot operation. Consider a bot configured for self-driving, drone applications, and other applications that may require rapid response for operation and/or safety. To the extent that such a bot encounters a deficiency, it may be imperative to address and/or otherwise remedy the deficiency as soon as possible. In at least some applications, a first bot controller 182a may be provided in a closer proximity to the first group of robots 184a. For example, at least a portion of the first bot controller 182a may be located and/or otherwise provisioned at a network edge proximate to the first group of robots 184a and/or to the access terminal 112 and/or the data terminals 114.

The first bot controller 182a may be configured to perform O&M functions, including, but not limited to initiating, performing and/or otherwise responding to bot diagnostic routines, to initiate and/or perform upgrades to software and/or hardware as may be required, to request, schedule and/or otherwise coordinate on-site repair as may be required, to initiate, perform and/or otherwise coordinate bot reconfigurations as may be required according to bot sharing activities. In at least some instances, the first bot controller 182a is in communication with one or more first storage entities 186a. In at least some embodiments, the first storage entities 186a may include data storage, e.g., a database, as may be used to maintain bot hardware and/or software. For example, the first storage entities 186a may electronically store records related to bot models, types, serial numbers, configurations, past and/or planned utilizations, past and/or future scheduling, bot maintenance activities, records of bot repairs, numbers, types and/or version of bot software and/or applications. In at least some embodiments, stored records may include records related to hardware, such as numbers, types and/or status of available bot attachment connectors and/or attached devices, types and capabilities and so on.

In at least some embodiments, the first storage entities 186a may include physical storage, e.g., a cabinet, a room, a container, a garage, a warehouse, as may be used to store one or more of the first group of robots 184a and/or related bot hardware, such as attachment devices as may be connected and/or reconnected, e.g., according to a reconfiguration activity as may be conducted in switching between different tasks. It is understood that in at least some instances, at least one bot of the first group of robots 184a may serve as a storage facility.

According to the illustrative example, a second group of bots 184b may be provided in cabled and/or wireless communication with one or more of the base station or access point 122 and/or mobile devices 124 and vehicle 126. The second group of bots 184b may be in further communication with the communications network 125 via the base station or access point 122. For example, one or more of the second group of bots 184b may be in communication with the bot support server 180 via the communications network 125. Likewise, in at least some embodiments, a third group of bots 184c may be provided in cabled and/or wireless communication with one or more of the audio/video display devices 144 via media terminal 142. The third group of bots 184c may be in further communication with the communications network 125 via the media terminal 142. For example, one or more of the third group of bots 184c may be in communication with the bot support server 180 via the communications network 125.

Further according to the illustrative example, and in at least some embodiments, one or more of a second bot controller 182b may be provided in a closer proximity to the second group of bots 184b or a third bot controller 182c may be provided in a closer proximity to the third group of bots 184c. For example, at least a portion of the second bot controller 182b may be located and/or otherwise provisioned at a network edge proximate to the second group of robots 184b and/or to the base station or access point 122 and/or mobile devices 124 and vehicle 126. Likewise, the third bot controller 182c, if provided, may be located and/or otherwise provisioned at a network edge proximate to the third group of robots 184c and/or to the audio/video display devices 144 via media terminal 142. The second and third groups of robots 184b, 184c may operate as described in relation to the first group of robots 184a. Alternatively, or in addition, one or more of the second or third bot controllers 182*b*, 182*c*, and/or the second or third storage entities 186*b*, 186*c*, if provided, may operate as described in relation to the first bot controller 182*a* and/or the first storage entity 186*a*.

In at least some embodiments, one of the first, second or third bot controllers 182*a*, 182*b*, 182*c* operating within one of the example access domains 110, 120, 140 may control one or more of the first, second and third groups of robots 184*a*, 184*b*, 184*c* in another access domain 110, 120, 140. For example, the second bot controller 182*b* may control the first group of robots 184*a* alone and/or in combination with control of the second group of bots 182*b*. Likewise, one of the first, second or third storage entities 186*a*, 186*b*, 186*c* operating within one of the example access domains 110, 120, 140 may provide electronic, virtual and/or physical storage services to one or more of the first, second and third bot controllers 182*a*, 182*b*, 182*c* and/or one or more of the first, second and third groups of robots 184*a*, 184*b*, 184*c* in another access domain 110, 120, 140. For example, the second bot controller 182*b* may control the first group of robots 184*a* alone and/or in combination with control of the second group of bots 182*b*.

To the extents the bots are mobile and/or relocatable, it is understood that bots of the first, second and/or third groups of robots 184*a*, 184*b*, 184*c* operating within their respective access domains 110, 120, 140 may be transferred to another one of the access domains 110, 120, 140. For example, transfer of a bot in this manner may be performed in response to a bot sharing schedule. Alternatively, or in addition, transfer of a bot in this manner may be performed in response to a maintenance action, such as a repair and/or replace action.

By way of example, a first robot 184*b*' of the second group of bots 184*b* may serve as a repair robot 184*b*'. The first bot controller 182*a* may identify a deficiency within a second robot 184*a*' of the first group of robots 184*a*. The first bot controller 182*a* may initiate a repair and/or replacement action to address the deficiency within the second robot 184*a*'. To the extent that a service of the repair robot 184*b*' is required, the first bot controller 182*a* may initiate a request for assistance of the repair robot 184*a*' with the repair and/or replacement action. In at least some embodiments, the first bot controller 182*a* may request assistance of the repair robot 184*a*' via the second bot controller 184*b*. Alternatively, or in addition, the first bot controller 182*a* may request assistance of the repair robot 184*a*' via direct communications with the repair robot 184*a*' and/or in coordination of the bot support server 180. To the extent bot attachment devices and/or systems are provided, it is envisioned that such attachments may be managed within their respective access domains 110, 120, 140 and/or across different access domains 110, 120, 140. Management of bots and/or bot attachments across different access domains 110, 120, 140 may be advantageous in facilitating and/or otherwise minimizing transportation activities. For example, such cross-domain management activities may be based upon proximities of the bots and/or bot attachments. Alternatively, or in addition, such cross-domain activities may be based upon ownership, leases and/or subscriptions, e.g., utilizing repair bots and/or bot attachments that may be commonly owned, leased and/or otherwise subject to compatible levels of subscriptions.

FIG. 2A is a block diagram illustrating an example, non-limiting embodiment of a robot operation and maintenance (O&M) system 200 functioning within the communication network of FIG. 1 in accordance with various aspects described herein. The example O&M system 200 includes a bot controller, referred to herein as a smart community (SC) controller 204. The SC controller 204 may manage, without limitation, one or more aspects of bot operation, bot sharing, bot storage, bot transport, bot maintenance, including repair and/or replacement. The example O&M system 200 further includes one or more storage entities 206. The storage entities 206 may include one or more of electronic storage, virtual storage and/or physical storage entities. According to the illustrative example, the one or more of the storage entities 206 may be configured to store a bot component inventory. In at least some embodiments, the bot component inventory may include bot software and/or virtual components, e.g., software modules, bot applications or "apps," bot profiles, bot avatars, and/or updates to bot software and/or bot applications. Alternatively, or in addition, the bot component inventory may include physical bots, bot components and/or bot attachments. Bot components may include, without limitation, bot modules and/or pars, such as processors, storage devices, circuit boards, mechanical systems, attachment devices, such as cameras, microphones, projectors, speakers, physical environmental manipulators, transport systems, skins, and so on.

The illustrative example further includes a transport controller. In the context of a smart community (SC) application, the transport controller may be referred to as an SC transport controller 208. One or more of the SC controller 204, the storage entities 206 and/or the SC transport controller 208 may be in communication with each other via a network 210. The network may include one or more of a wide area network, e.g., the Internet, local area networks (LANs), wireless networks, e.g., WiFi and/or mobile cellular and the like.

According to a first step 1, a bot 202' performs a self-diagnostic process, e.g., to identify any deficiencies. Deficiencies may include, without limitation, a bot software error, e.g., an inoperable bot software routine or app. Alternatively, or in addition, an efficiency may include a bot hardware error, e.g., a broken or otherwise inoperable hardware component or subsystem. In at least some embodiments, a deficiency may indicate that a version of bot software and/or hardware is out of date and should be updated and/or otherwise replaced. In at least some embodiments, the self-configuration check may determine whether the bot 202' is configured and/or otherwise capable of attempting self-repair. Without limitation, self-repair may include repair of the bot or components of and/or utilized with the bot, such as bot subsystems, adapters and/or attachment devices. In at least some embodiments, self-repair may include physical repair, e.g., repair to bot hardware. Alternatively, or in addition, self-repair may include software upgrades and/or fixes. To the extent the bot 202' incorporates any aspects of a virtual bot, the self-diagnostics and/or self-repair may be accomplished virtually, e.g., at least partially or wholly within a virtual environment, such as a metaverse.

To the extent that self-repair is possible and/or otherwise advisable, the bot 202', at step 1*a*, may attempt self-repair. Upon completion of any self-reparative actions, a self-diagnostic process may be repeated to assess success of the self-reparative action. It is envisioned that a self-repair action may require hardware and/or software components not accessible to the bot 202', the bot may request a provisioning of the necessary hardware and/or software components. Such provisioning may be requested via the SC controller 204.

To the extent that any self-repair requires the assistance of an external entity, the bot 202' may initiate a request for such assistance. For example, the bot 202', at step 1*b*, may request the assistance of the SC controller 204 by placing a "call" for help to the SC controller 204 to address and/or otherwise correct any detected deficiencies. Without limitation, the requested assistance may include a request for provisioning, upgrading, replacing and/or otherwise reconfiguring bot software and/or hardware. The requested assistance may be in the form of upgrades, to the extent the detected deficiencies related to software and/or hardware being out of date and/or out of compliance. In at least some embodiments, the bot request may include results of the self-diagnostic process, e.g., identifying a deficient software and/or hardware component of the bot 202'. Alternatively, or in addition, the request may include at least a portion of a corrective action as may have been determined by the bot 202', e.g., in cooperation and/or association with the self-diagnostic process.

In at least some embodiments, some or all of the diagnostic process may be initiated, performed and/or otherwise orchestrated by a device other than the bot 202', e.g., by the SC controller 204. For example, the SC controller 204 may initiate a bot diagnostic routine periodically. Such diagnostic routines may be performed according to a schedule, e.g., hourly, daily, weekly, and so on. Alternatively, or in addition, such diagnostic routines may be performed according to an event, such as in anticipation of a scheduled bot task, a bot transfer, a bot reconfiguration, a bot storage, a bot retrieval from storage, a bot relocation, and so on.

Responsive to a result of a diagnostic routine and/or a request as may be received by the SC controller 204, the SC controller 204, at step 2, may access the storage entities 206, e.g., to review and/or otherwise check availability according to an inventory. For example, a bot software and/or hardware inventory maintained within one or more of the storage entities 206 may be inspected and/or otherwise queried regarding a requested bot capability.

The SC controller 204, at step 3, may determine what types of bot feature functions are required. To the extent that a diagnostic process identified a deficiency, the SC controller 204 may determine what types of features and/or functions are required to address and/or otherwise correct the deficiencies. In at least some embodiments, an output of diagnostic process may identify any observed deficiencies and/or any bot features and/or functions to address the deficiencies. Alternatively, or in addition, one or more of the bots 202', the SC controller 204, or a combination of both may perform a repair routine. The repair routine may be initiated responsive to an output of the diagnostic process indicating a deficiency. In at least some embodiments, the repair routine may apply one or more rules and/or policies to identify a corrective action. Once identified, the SC controller 204 may initiate a repair, e.g., by downloading data, software and/or otherwise instantiating a repair process that may operate alone or in combination with downloaded data and/or software to repair the bot 202' in such a manner so as to correct the deficiency. Once repaired, the bot 202' and/or the SC controller 204 may repeat the diagnostic process to verify that the repair action corrected the deficiency.

To the extent that the bot 202' may require physical assistance in performing any repair actions to address observed deficiencies, the SC controller 204, at step 4, may initiate a request for a service visit. For example, the SC controller 204 may send a message to the SC transport controller 208 requesting that a first responder bot, e.g., referred to as a transport bot 212, be deployed to a location of the bot 202', e.g., for further assessment, performance of on-site service, e.g., repair, and/or for replacement. The transport bot 212 may obtain any repair items that may be necessary, e.g., from the storage entities 206, e.g., storage facilities. To the extent that repair items include software, the transport bot 212 may download the software via the network 210. To the extent that the repair items include hardware, the transport bot 212 may identify a location of the hardware, e.g., at a physical storage location of the storage entities 206, e.g., storage facilities. One of the SC transport controller 208, the transport bot 212, or a combination of both, may plan a travel rout according to a location of the physical repair item and/or a location of the bot 202' to be serviced. The transport bot 212 may proceed according to a predetermined route to a location of the bot 202'.

In at least some embodiments, the local service bot 203 may perform and/or otherwise assist in performance of a corrective action. For example, a repair action may involve participation of a repair person 205. The repair person 205 may be a skilled person, e.g., knowledgeable in servicing the bots. In at least some embodiments, a service call initiated by the bot 202' and/or the SC controller 204 may request local and/or remote participation of such a skilled repair person 205. Alternatively, or in addition, the repair person 205 may represent a user or other individual without any specialized skills. Such an unskilled repair person 205 may perform and/or otherwise assist in performance of a repair action according to instructions. The instructions may be provided by one or more of the bots 202' being repaired, the SC controller 204, the transport bot 212.

In at least some embodiments, a local service bot 203, at step 5, may be deployed to repair a bot 202". A request for assistance of the local service bot 203 may be initiated by one or more of the bots 202', the SC controller 204, the transport bot 212 and/or a repair person 205. The local service bot 203 may be configured to perform one or more of a software repair action, a hardware repair action, or both.

By way of further example, the same or similar process may be performed for a home bot scenario, in which the SC controller 204 may be augmented with and/or replaced by a smart home (SH) controller. For example, a requirement for a maintenance and/or repair action may be determined and/or otherwise detected. A home bot may run a self-diagnostic routine to determine a deficiency. The home bot may determine whether it may be equipped to perform a repair action, and if so to initiate the repair action to address the observed deficiency. Alternatively, or in addition, the home bot may place a call for help, e.g., to the SH controller. The SH controller may determine an appropriate course of repair action, e.g., locating any software and/or hardware resources as may be necessary. The SH controller may initiate the repair action, e.g., operating remotely and/or with the assistance of a first responder robot. To the extent a first responder bot is required, the SH controller may place a call via the SC transport controller 208. The repair action may proceed, e.g., by downloading software, instantiating a corrective module and/or performing physical and/or virtual repairs as may be necessary. It is understood that virtual repair actions may include, without limitation, repairs to a virtual bot operating with the virtual environment. The repairs may be performed by and/or otherwise assisted by a local service bot 203, a virtual repair bot 209 and/or a combination of both.

Figure 2B:
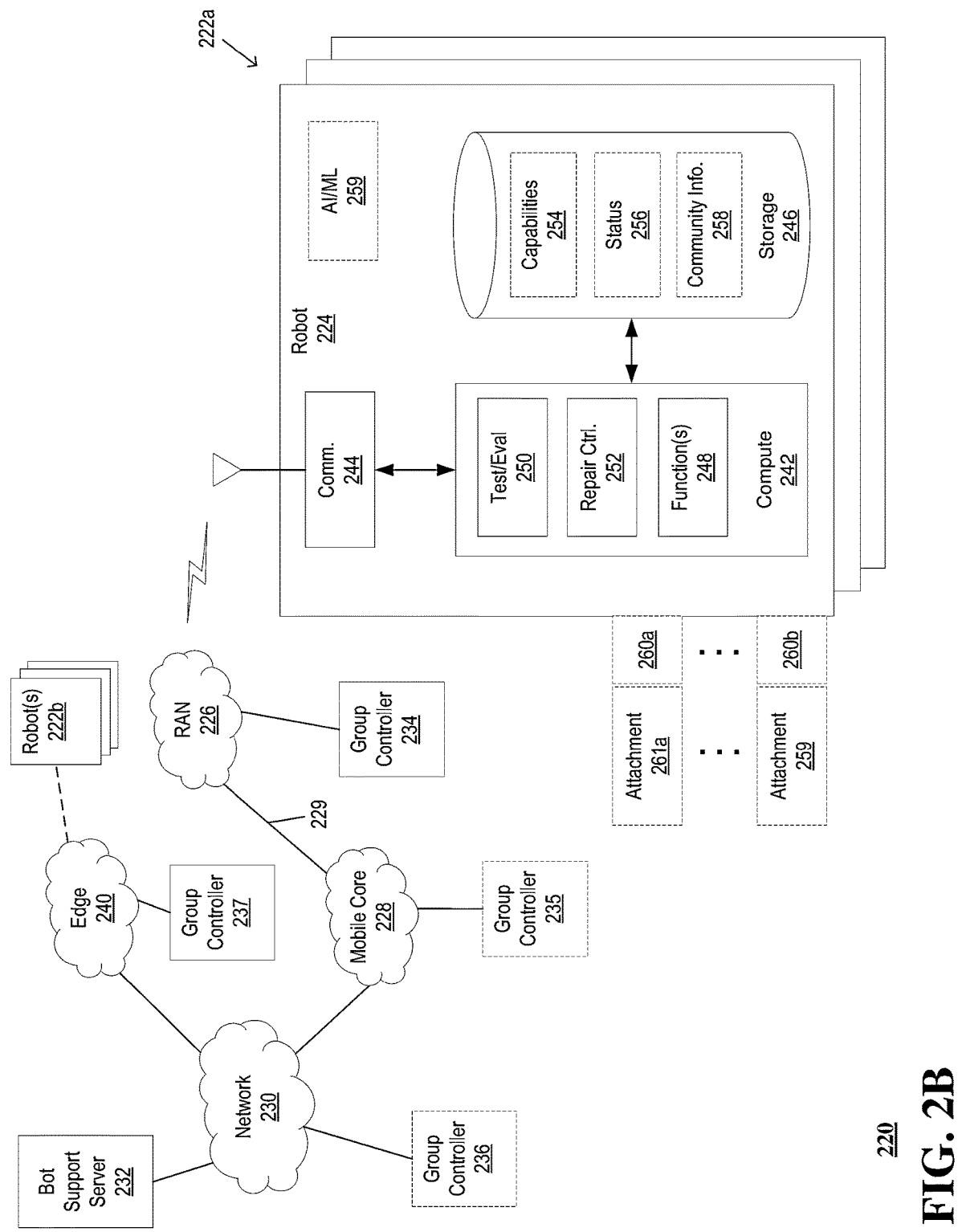
FIG. 2B is a block diagram illustrating another example, non-limiting embodiment of a robot operation and maintenance system functioning within the communication network of FIG. 1 in accordance with various aspects described herein.

FIG. 2B is a block diagram illustrating another example, non-limiting embodiment of a robot operation and maintenance system 220 functioning within the communication network of FIG. 1 in accordance with various aspects described herein. According to the illustrative example, a first group of robots 222*a* is provided. The first group of robots may be adapted to perform one or more individual and/or collective tasks. In at least some embodiments, one or more bots of the first group of robots 222*a* may be reconfigurable, e.g., according to software and/or hardware configurations. Consider a robot 224 configured to autonomously perform one or more software, virtual and/or physical actions according to a predetermined robot task. The robot 224 may include one or more of a compute system 242, a storage system 246 and/or a communication system 244. The compute system 242 may include, without limitation, a function module 248 configured to execute one or more operational functions, e.g., directed to one or more robot tasks that preferably include the predetermined robot task. Without limitation the robot tasks may be directed toward performance in a physical realm, by incorporating one or more of software and/or hardware actions. Alternatively, or in addition, the robot tasks may be directed toward performance in a virtual realm, e.g., by incorporating one or more of software and/or virtual hardware actions.

In at least some embodiments, the compute system 242 may include one or more of a test and/or evaluation module 250 and/or a repair function module 252. The test and/or evaluation module 250 may be configured with functionality to perform robot test. Robot tests may include, without limitation, self-diagnostic tests adapted to identify deficiency of the robot 224. Alternatively, or in addition, the robot tests may include other diagnostic tests adapted to identify a deficiency in another robot of the first group of robots 222*a*. In at least some embodiments, the robot tests may include diagnostic tests that work alone or in combination with a test and/or evaluation module of another robot of the first group of robots to identify a deficiency of the robot 224, of the other robot, of the entire first group of robots 222*a*, and/or related to deficiencies affecting a cooperative robot task as may be performed by two or more robots of the first group of robots 222*a*.

The storage system 246 may store one or more of data, programs, functions, applicant program interfaces (API) and/or apps. By way of example, the storage system 246 includes stored capability content 254, stored status content 256 and stored community information 258. Without limitation, the stored capability content 254 may include capability data of the robot 224, including one or more of software capability data that may include, without limitation, operational software, operating system software, apps, and the like. Alternatively, or in addition the stored capability content 254 may include hardware capabilities, such as processing speed, storage capacity, mobility features, imaging features, auditory features, speech-related features, environmental manipulation features, e.g., types and/or capabilities of robot attachments, such as arms, fingers, facial expressions, and the like.

Without limitation, the stored status content 256 may include configuration data of the robot 224, including one or more of software configuration data that may include, without limitation, operational software configurations, app settings, and the like. Alternatively, or in addition the stored status content 256 may include hardware configurations and/or states, mobility configuration and/or state, imaging configuration and/or state, auditory configuration and/or state, speech-related configuration and/or state, environmental manipulation features configuration and/or state, e.g., configurations and/or states of robot attachments, such as arms, fingers, facial expressions, and the like. Alternatively, or in addition the stored capability content 254 and/or the stored status content 256 may include hardware configuration data that may include, without limitation, resident robot hardware, e.g., motherboards, processors, RAM, I/O, robot profile data.

The example robot 224 includes one or more connectors 260*a*, 260*b*, generally 260. The connectors may include similar connectors 260, different connectors 260, and/or combinations of similar and different connectors 260. At least some of the connectors 260 may be configured for attachment of one or more robot attachments 261*a*, 261*b*, generally 261. For example, a first attachment 261*a* may include a transport system, such as a carriage and/or tractor tread system. The first connector 260 may include a mechanical interface an electrical interface, a software interface and/or any combination of the aforementioned interfaces. The first connector 260 may be configurable to facilitate incorporation of the first attachment 261 into the robot 224, such that the robot 224 is equipped with a corresponding function, e.g., transport.

The compute system 242 may be in communication with one or more of the storage system 246 and/or the communication system 244. In at least some embodiments, the compute system 242 may retrieve information from the storage system 246, provide new information to be stored in the storage system 246 and/or revise information previously stored in the storage system 246. The robot 224, e.g., via the communication system 244, may be in in communication with one or more other devices and/or systems, such as a bot support server 232, one or more robot group controllers 234, 235, 236, 237 and/or another groups of robots 222*b*.

According to the illustrative example, the robot 224 is in communication with a radio access network (RAN) 226 of a mobile communication network. The RAN 226 may include a base transceiver station operating according to any of the example wireless communication systems disclosed herein and/otherwise generally known, including 4G, LTE, 5G and so on. In at least some embodiments, the RAN 226 may be in further communication with a mobile core network 228 via a backhaul communications link 229. The mobile core network 228 may, in turn, be in further communication with yet another network 230, such as a wide are network, e.g., the Internet.

According to principles of mobile edge computing (MEC), the RAN 226 and/or the mobile core network 228 may be considered as a network edge node. According, the network edge node may include compute and/or storage capacity that may be elastic, e.g., configurable according to cloud computing techniques. Accordingly, one or more servers, processes and/or storage units may be instantiated in one or more network edge nodes, as may be necessary to fulfill service requirements, e.g., service level agreements (SLAs) and/or quality of service (QoS) requirements as may be associated with SLAs.

In at least some embodiments one or more of the robot group controllers 234, 235, 236, 237 may be instantiated in whole or in part in a respective network edge node. According to the illustrative example, elements of the RAN 226 may serve as a MEC node adapted to host all or at least a substantial portion of the robot group controller 234. The MEC node may include functionality of one or more of the first robot controllers 182, the SC controller 204, the SC transport controller 208, the bot component inventories 186 and/or the storage entities 206 (FIGS. 1 and 2A) the SH controller, and/or the robot group controllers 234. The MEC nodes may include functionality adapted to perform, oversee and/or otherwise interpret bot diagnostic processes. Alternatively, or in addition, the MEC nodes may include functionality adapted to initiate and/or otherwise respond to robot calls for assistance, service calls, operator inquiries, bot inquiries, and the like.

The illustrative example includes other network edge nodes, e.g., MEC node 240. It is understood that robot group controllers 234, 235, 236, 237 may be instantiated in respective MEC nodes to provide O&M services to a proximate robot community. In at least some embodiments, the O&M services may be performed independently, and thus locally within network and/or physical proximity of robots being serviced. Alternatively, or in addition, the O&M services may be performed in conjunction with the bot support server 232. The bot support server may operate in a backend capacity, e.g., performing tasks that may not be time sensitive. For example, the bot support server 232 may provision one or more of the robot group controllers 234, 235, 237, 237 with updated software.

Alternatively, or in addition, the bot support server 232 may perform other coordinating tasks between robots within the same group of robots 222a, 222b, and/or among the different groups. For example, the bot support server 232 may perform a robot utilization evaluation function. Such evaluation functions may collect utilization records and/or statistics as may be generated by the robot 224 and/or the robot group controller 234, 235, 236, 237. The bot support server 232 may perform calculations and/or simulations adapted to increase utilization and/or otherwise optimize utilization of the groups of robots 222a, 222b. In at least some embodiments, optimization may be based on one or more of operation and maintenance activity, e.g., designed to minimize maintenance actions and/or costs. Alternatively, or in addition, optimization may be based on provisioning robot support assets, including software and/or hardware assets. Asset costs, duplication, transport, maintenance, underutilizations, and the like may be used alone and/or in combination of any optimizations. To the extent that any such evaluations identify alternative system configurations, the bot support server 232 may be configured to initiate optimizations, e.g., by rearranging groups of robots, storage of robots and/or robot attachments, locations of service bots, and the like.

In at least some embodiments, artificial intelligence (AI) and/or machine learning (ML) may be applied to one or more of the various techniques disclosed herein. For example, the robot 224 may include an AI module 259. The AI module may observe O&M activities of the robot and predict robot maintenance actions adapted to reduce and/or otherwise introduce greater efficiency to any O&M related activity. Alternatively, or in addition, similar AI modules may be provided in one or more of the robot group controllers 234, 235, 236, 237 and/or the bot support server 232. In at least some embodiments, the AI modules may operate independently and/or in collaboration. For example, one or more of the AI modules may predict O&M activities and initiate a pre-provisioning of software and/or hardware assets to one or more of the groups of robots 222a, 222b, such that the pre-provisioned assets are adapted to reduce one or more of a cost to repair, a time to repair, a mean time between failures, and so on.

Figure 2C:
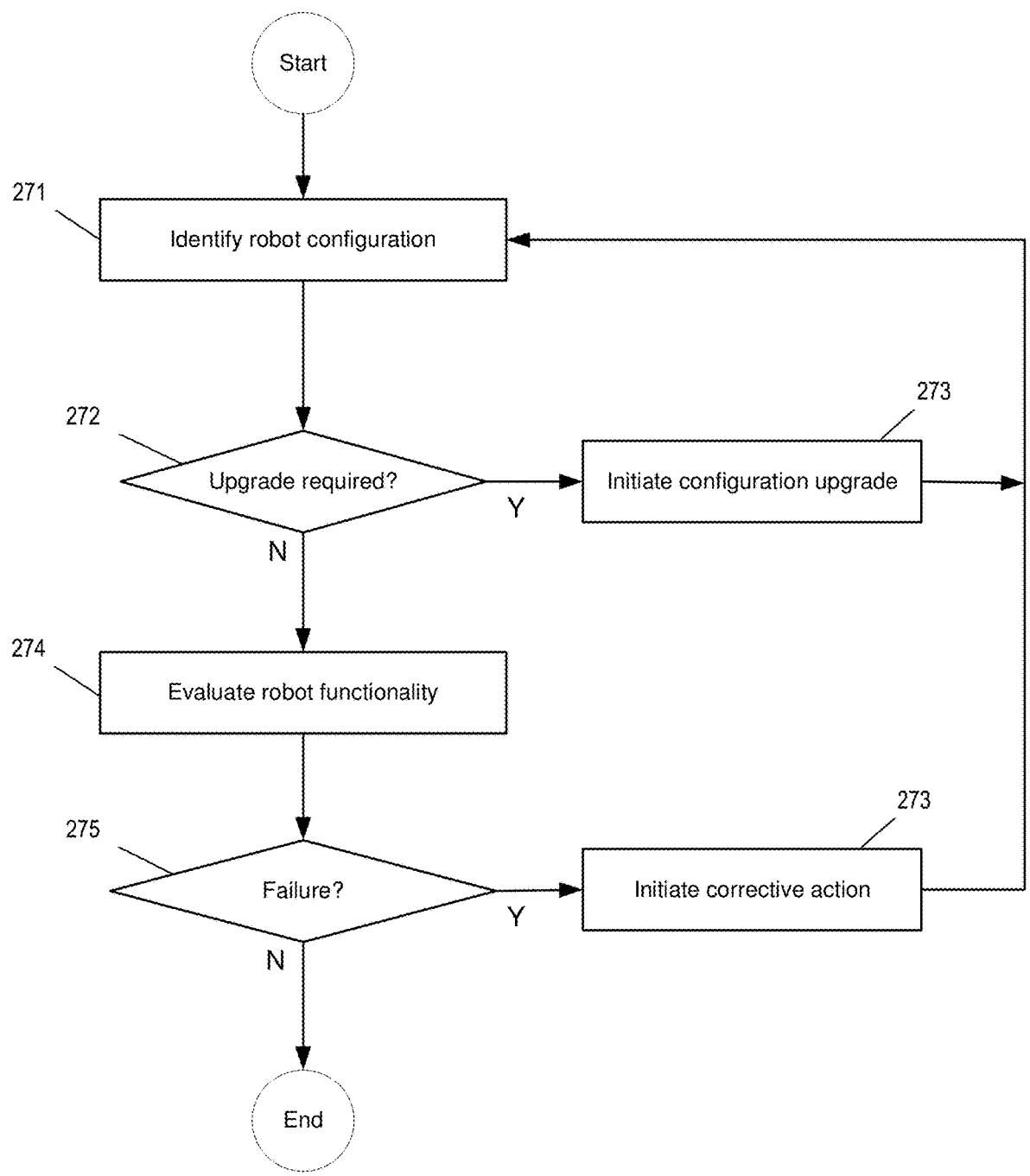
FIG. 2C depicts an illustrative embodiment of a robot operation and maintenance process in accordance with various aspects described herein.

FIG. 2C depicts an illustrative embodiment of a robot operation and maintenance process 270 in accordance with various aspects described herein. According to the example process, a robot configuration is identified at 271. A determination is made at 272 as to whether an upgrade is required. An upgrade may relate to one or more of software, firmware, hardware of the robot. Alternatively, or in addition, the upgrade may relate to a configuration of a configurable robot. Configurations may include rearranging one or more elements of a robot, e.g., by one or more of a folding, bending, twisting, rotating, translating disconnecting, reconnecting action. In at least some embodiments, such rearrangements may be performed without adding and/or removing any components of the robot. Alternatively, or in addition, configurations may relate to a functional capability, e.g., a hardware and/or software version and/or configurable parameters.

To the extent it is determined at 272 that an upgrade is required, a configuration upgrade is initiated at 273. By way of example, a configuration upgrade may include updating a software item, such as an operating system, a function, an API and/or an app. Alternatively, or in addition, the configuration upgrade may include updating a hardware item, such as a physical component and/or module of the robot and/or an attachment to the robot. In some instances, the configuration upgrade may be performed by the robot, e.g., determining an upgrade requirement responsive to a self-diagnostic routine, then obtaining a copy of the updated item and incorporating the updated item into the robot. Alternatively, or in addition, the upgrade requirement may require assistance of another, such that a call for help may be initiated by the robot and/or by a robot controller. The call for help may identify a deficiency and/or a requirement for correcting a deficiency. The call for help may be addressed by one or more of a robot controller, a backend robot support server, a repair robot and/or a human.

Once upgraded, the process may repeat, e.g., returning to step 271. It is understood that in at least some embodiments, the example process 270 may be implemented periodically, e.g., according to a schedule. Alternatively, or in addition, the example process 270 may be implemented responsive to an event. Example events may include a robot service notice as may be sent from a robot service provider. Other examples include, without limitation, initiation by an O&M system and/or operator, and/or by a robot user, and/or by the robot itself, e.g., upon determining that the process 270 should be performed. Such determinations may be based at least in part upon AI, which may monitor robot operation to detect and/or otherwise predict O&M issues.

According to the example process 270, the robot functionality may be evaluated at 274. Evaluation may be conducted according to a self-diagnostic test performed by the robot. Alternatively, or in addition, evaluation may be performed by any combination of the robot, a robot controller, a backend robot support server and/or a repair bot. A determination may be made at 275 as to whether a deficiency was detected. A deficiency may include, without limitation, a software deficiency, a hardware deficiency, an operational deficiency, e.g., according to an intended robot task. As robot tasks may change and/or adapt based on environmental and/or user requirements, it is envisioned that the example process 270 may be performed responsive to receipt of a new robot task and/or requirement. Thus, the deficiency may not relate to any failure of the robot according to a current configuration, but instead, based on a deficiency of the currently configured robot according to the new task requirement.

To the extent a deficiency was determined at 275, the process 270 may proceed to initiate a corrective action at 273. Corrective actions may include, without limitation, any of the examples disclosed herein. Alternatively, or in addition, corrective actions may include a redeployment of one or more robots of different groups of robots. It is envisioned that there may be more than one corrective action available. For example, a local robot may require a reconfiguration to perform a new task, or to correct a failed component or attachment. To the extent another robot may be available within a commonly managed group of robots, that robot may be reassigned to perform the new task. A future maintenance activity may be scheduled at a later, more convenient time to correct the original robot. Such a redeployment process may be extended to other groups of robots that may be, for the most part, separately managed, e.g., assigned to a different household and/or a different community.

In view of such alternative repair actions, one or more of the robot, a robot controller and/or a backend robot support server may perform a tradeoff calculation, e.g., compare one or more of costs, delays, and/or complexity of implanting some and/or all available corrective actions. A preferred corrective action may then be selected from among the alternatives.

Figure 2D:
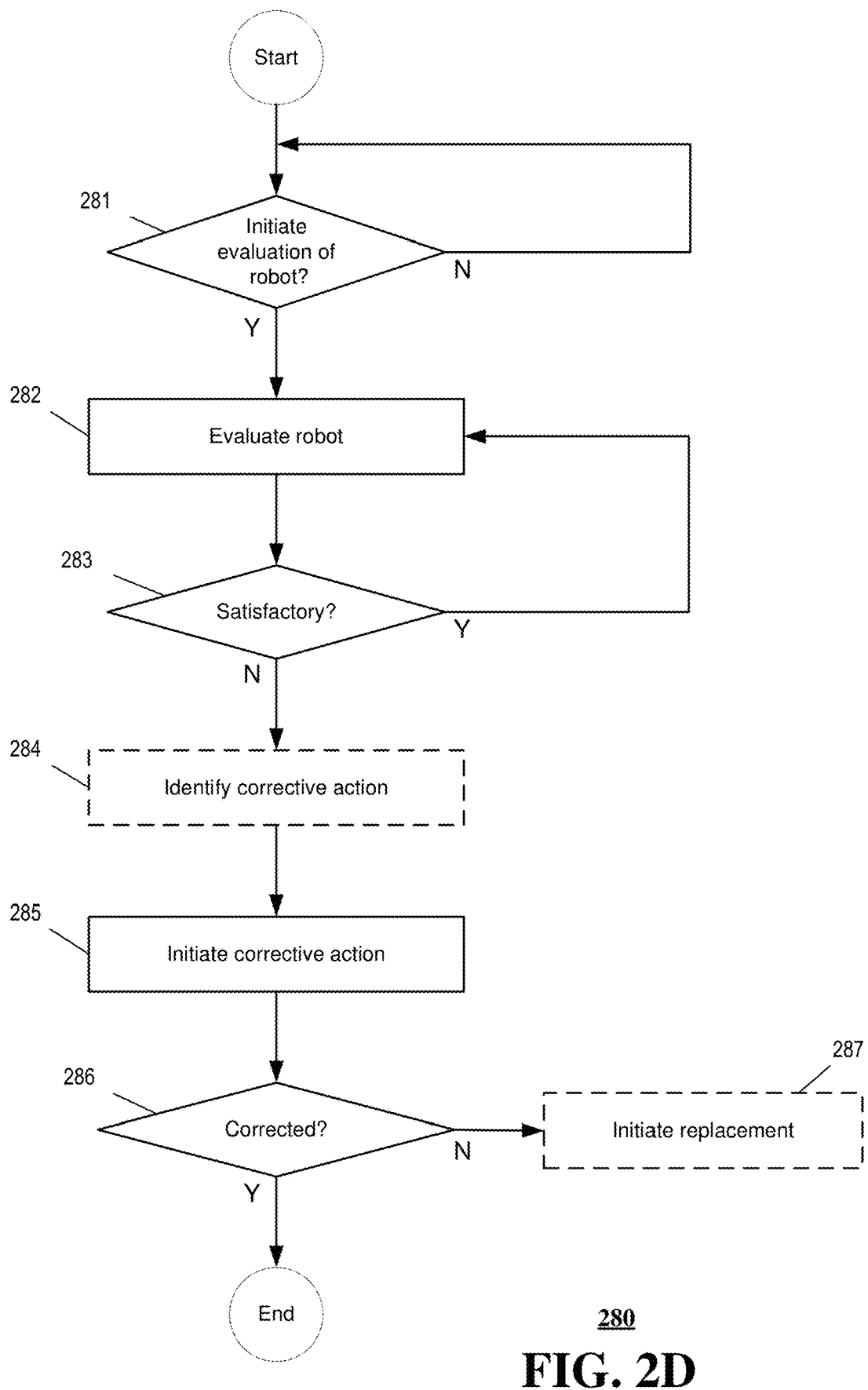
FIG. 2D depicts an illustrative embodiment of a robot operation and maintenance process in accordance with various aspects described herein.

FIG. 2D depicts an illustrative embodiment of a robot operation and maintenance (O&M) process 280 in accordance with various aspects described herein. According to the illustrative O&M process 280, a determination is made at 281 as to whether a robot evaluation should be initiated. To the extent it is determined that the evaluation should not be initiated, the process may terminate and/or otherwise repeat the evaluation step 281 after some delay. The delay may be based on one or more of "wall clock" time, robot operational time, and/or some event, such as an error code, a user request, and O&M schedule, and so on.

To the extent it is determined at 281 that a robot evaluation should be initiated, the evaluation of the robot is performed at 282. In at least some embodiments, the evaluation may be performed by the robot, e.g., according to a self-diagnostic or auto diagnostic routine. Alternatively, or in addition, the evaluation may be performed by any combination of the robot, another robot of a commonly shared group of robots, a robot group controller, and/or a backend robot support server.

A determination is made at 283 as to whether the robot evaluation was satisfactory. The evaluation may be configured to identify one or more deficiencies. In such instances, a satisfactory evaluation may correspond to there being no deficiencies. Alternatively, or in addition, the satisfactory evaluation may correspond to there being minimal deficiencies, e.g., that do not require immediate attention and/or will not impact an intended operation of the robot. To the extent that the evaluation is satisfactory, the process may return to step 282, e.g., repeating the evaluation. Such repetition may be performed after some period of delay. Alternatively, or in addition, to the extent that the evaluation is satisfactory, the process may terminate and/or otherwise return to step 281.

In at least some embodiments, the process 270, at 284, identifies one or more corrective actions (shown in phantom). The corrective actions may be determined based on a nature, type, number and/or severity of any deficiencies resulting from the evaluation at 282. For example, one or more of the robot, another robot of a shared group of robots, a robot group controller and/or a backend robot support server may be configured with a function that evaluate the deficiencies and recommends one or more resolutions, also referred to as corrective actions and/or repair actions. Alternatively, or in addition, the corrective action may be identified and/or otherwise inferred from the deficiency, such that the identification at 284 is unnecessary.

In either instance, the O&M process 280 proceeds to initiate the corrective action at 285. The corrective action may include any of the various examples disclosed herein, including, without limitation, software upgrade, software replacement, software reconfigurations, hardware upgrades, hardware replacement, hardware reconfigurations according to the same and/or different hardware, e.g., adding and/or otherwise replacing a robot attachment.

In at least some embodiments, the example O&M process 280 determines, at 286, as to whether the deficiency has been corrected. To the extent that the deficiency has not been corrected, the O&M process 280 may initiate a replacement action at 287. The replacement action may include replacement of a deficient component and/or module of a robot. Alternatively, or in addition, replacement may include replacement of the entire robot. To the extent it is determined at 286 that the deficiency has been corrected, the example O&M process 280 may terminate. It is understood that the entire O&M process 280 may be repeated according to one or more of a schedule, a request and/or an event.

While for purposes of simplicity of explanation, the respective processes are shown and described as a series of blocks in FIGS. 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
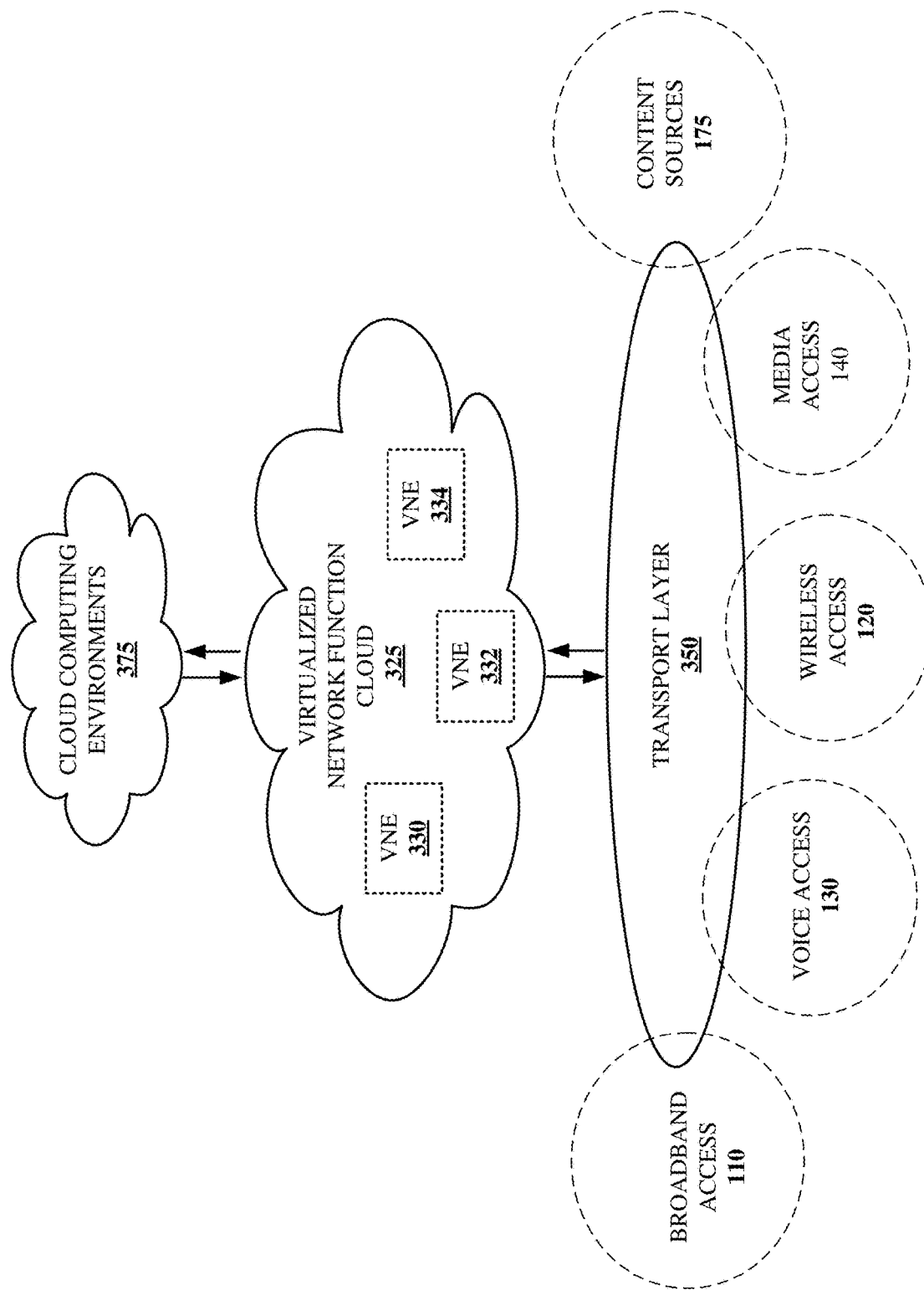
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of O&M systems 200, 220 and processes 270 and 280 presented in FIGS. 1, 2A, 2B, 2C, 2D and 3. For example, virtualized communication network 300 can facilitate in whole or in part determining a condition of a robot to obtain a determined result and, responsive to the determined result indicating a deficiency, identifying a corrective plan. The corrective plan is executed by the robot responsive to a determination that the robot is configured to perform the corrective plan. Alternatively, responsive to the determining indicating the robot is not configured to perform the corrective plan, the assistance of a robot controller is requested to initiate performance of the corrective plan.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
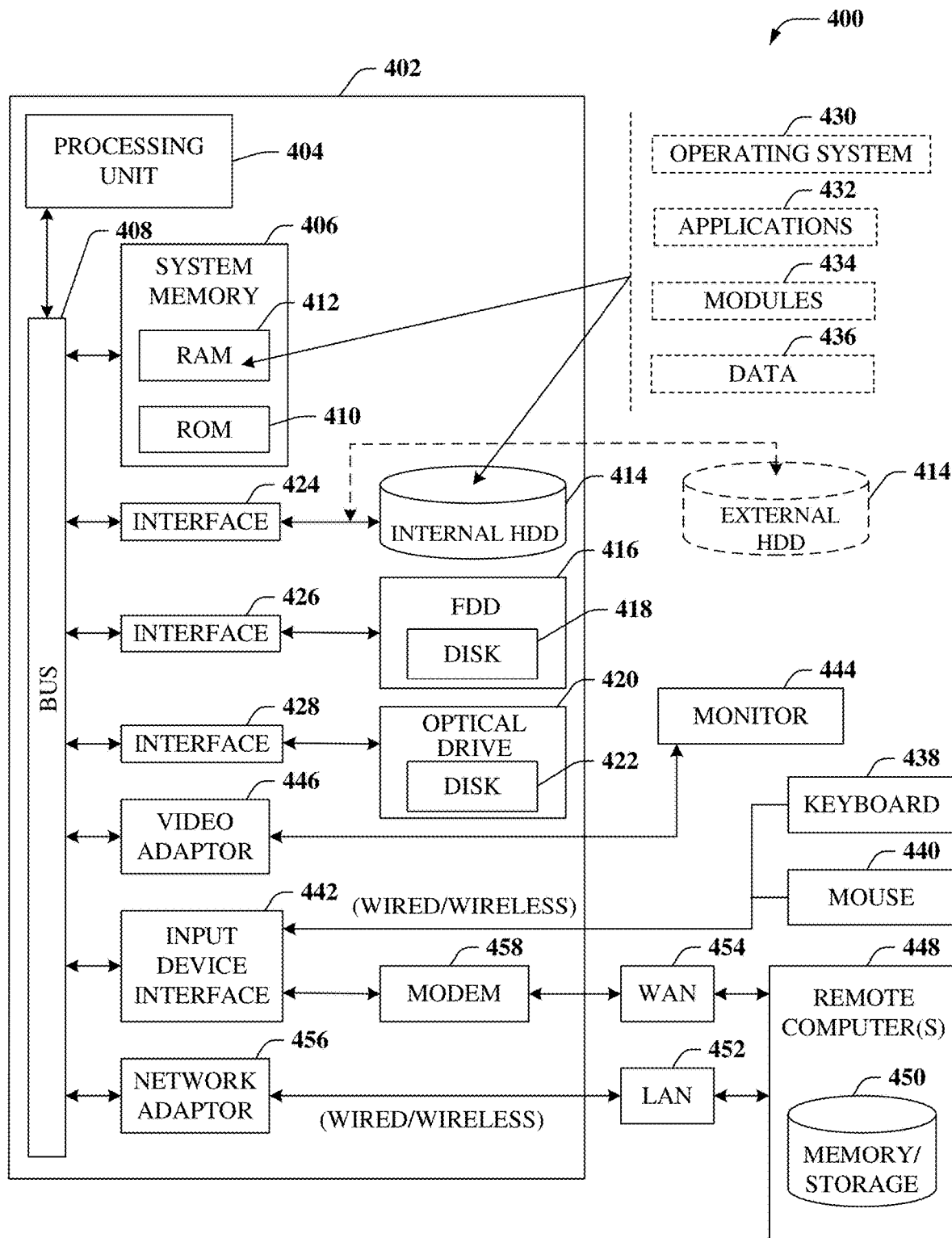
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining a condition of a robot to obtain a determined result and, responsive to the determined result indicating a deficiency, identifying a corrective plan. The corrective plan is executed by the robot responsive to a determination that the robot is configured to perform the corrective plan. Alternatively, responsive to the determining indicating the robot is not configured to perform the corrective plan, the assistance of a robot controller is requested to initiate performance of the corrective plan.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10 BaseT wired Ethernet networks used in many offices.

Figure 5:
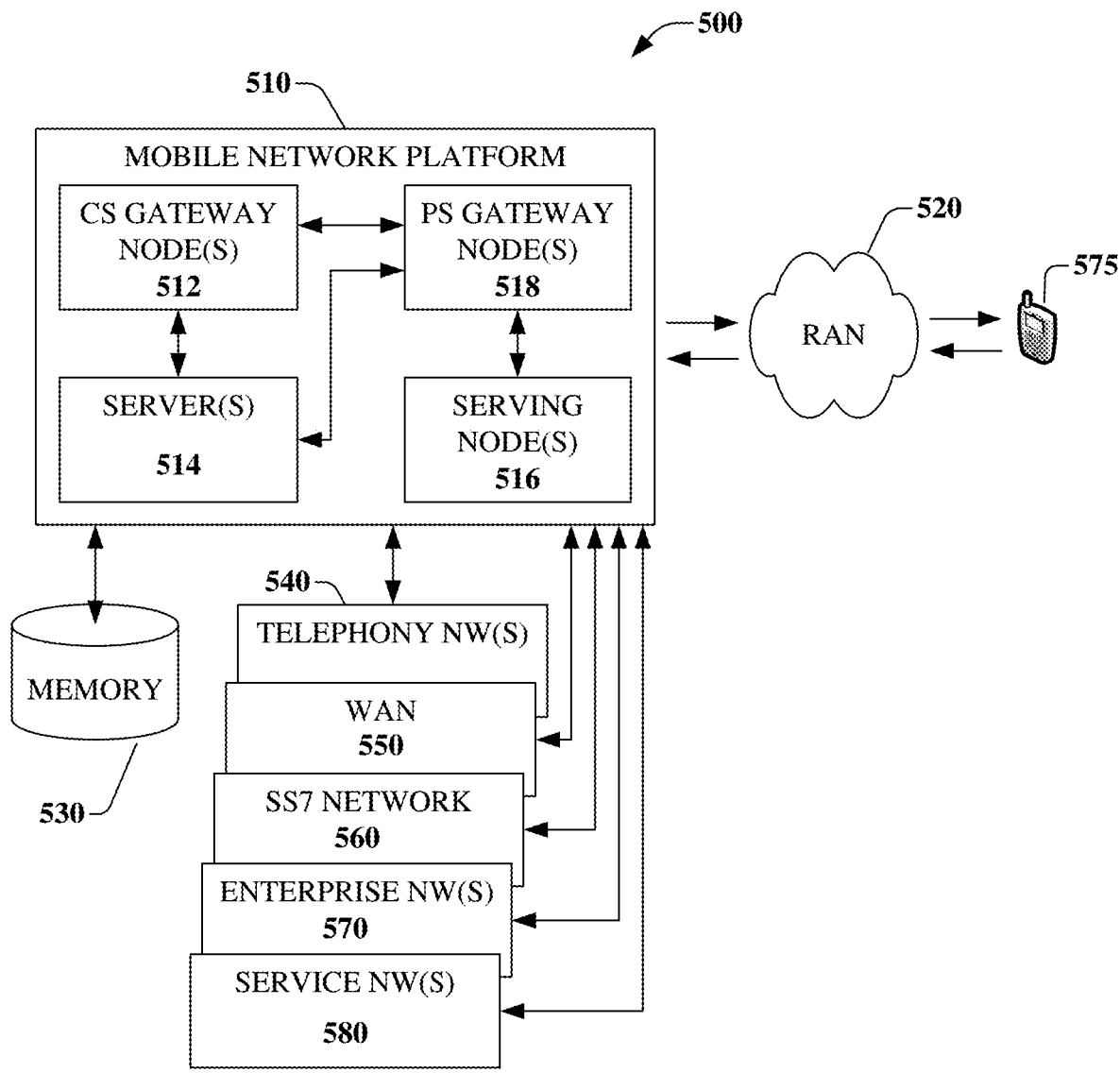
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining a condition of a robot to obtain a determined result and, responsive to the determined result indicating a deficiency, identifying a corrective plan. The corrective plan is executed by the robot responsive to a determination that the robot is configured to perform the corrective plan. Alternatively, responsive to the determining indicating the robot is not configured to perform the corrective plan, the assistance of a robot controller is requested to initiate performance of the corrective plan. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
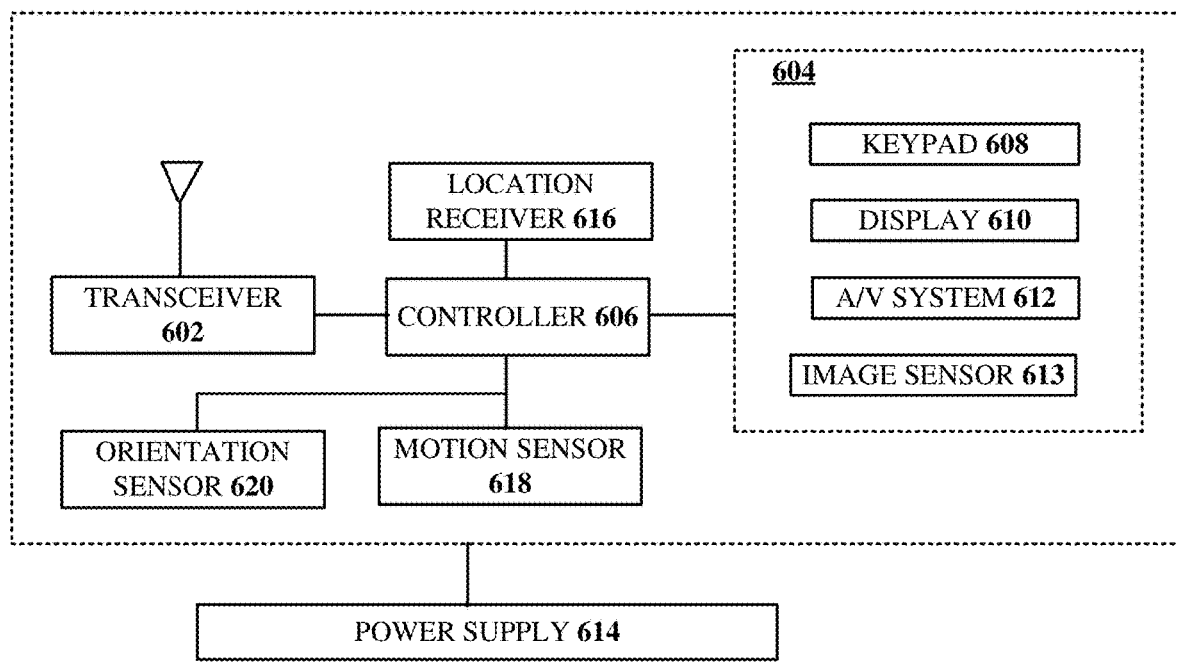
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining a condition of a robot to obtain a determined result and, responsive to the determined result indicating a deficiency, identifying a corrective plan. The corrective plan is executed by the robot responsive to a determination that the robot is configured to perform the corrective plan. Alternatively, responsive to the determining indicating the robot is not configured to perform the corrective plan, the assistance of a robot controller is requested to initiate performance of the corrective plan.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

According to the techniques disclosed herein, groups of robots, such as community bots and/or home bots, may be operated according to self-serviceable scheme in which the robots are configured with compute and communications capabilities to facilitate automatic repair and/or maintenance. Beneficially, any of the example robots may be configured to auto-detect a malfunction, to initiate a corrective action and/or to initiate a call for help, e.g., to a SC controller. In at least some embodiments, the SC controller may be configured to auto validate the bot and/or bot component inventory, e.g., regarding one or more of bot capabilities, availability, defects, and/or upgrades.

In at least some embodiments, the SC controller is configured to auto determine features and/or functions of a bot and to auto initiate a download of software for the repair. The SC controller may send an auto request to an SC transport controller, requesting that a first responder bot be sent to a location of the affected bot for on-site evaluation and/or repair. The example first responder bot may be configured to perform repairs on-site to repair, reconfigure and/or otherwise replace a deficient and/or broken bot.

Likewise, a home bot, once broken, may initiate a call for help to a SH controller. In at least some embodiments, the SH controller may act in a capacity of a first responder, e.g., determining what type of bot features and/or functions and/or hardware modules and/or attachments are required. To the extent the repairs may be addressed with software, the SH controller may download software, instantiate the software at the bot and otherwise perform a repair action remotely.

In some embodiments, a bot may transform into a storage. Storage may include any of the various storage examples disclosed herein, including bot storage, hardware storage entities, e.g., adapted for storing bot components, modules, parts, attachments, and the like. Similarly, a storage facility may be adapted to transform into a bot. It is understood that such transformations and/or requests for such transformations may initiate any of the example O&M techniques and processed disclosed herein. For example, in response to a request to transform a storage device into a bot, a diagnostic routine may be performed to determine whether the bot would have any deficiencies. To the extent deficiencies are detected, reparative steps may be initiated to reconfigure the bot to eliminate and/or otherwise resolve the deficiencies.

In some embodiments, one or more bots of a group of bots may serve as a mobile edge connected (MEC) node. Alternatively, or in addition, one or more of the bot group controllers may serve as a MEC node. The MEC node may be provisioned, e.g., according to cloud computing, to perform one or more of the O&M support activities disclosed herein. For example, the MEC node may include diagnostic routines, and/or middleware that may cooperate with one or more other O&M routines provided elsewhere in the system, e.g., at one or more other robots, at one or more other groups of robots, e.g., according to different communities or households, and/or at any backend robot support servers.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A robot, comprising:
a processing system including a processor; and
a memory that stores executable instructions that, when executed by the processing system, facilitate performance of operations, the operations comprising:
self-evaluating, by the robot of a shared plurality of robots, a condition of the robot to obtain a self-evaluation result;
identifying a corrective action responsive to the self-evaluation result indicating a deficiency;
determining whether the robot is configured to perform the corrective action;
responsive to the determining indicating the robot is configured to perform the corrective action, performing, by the robot, the corrective action; and
responsive to the determining indicating the robot is not configured to perform the corrective action:
generating a message that requests assistance to perform the corrective action; and
forwarding the message to a shared-robot controller, prompting the shared-robot controller to initiate performance of the corrective action.

2. The robot of claim 1, wherein the self-evaluating comprises auto detecting a malfunction of the robot.

3. The robot of claim 1, further comprising:
identifying a functional capability of the robot, wherein the condition of the robot comprises a status of the functional capability.

4. The robot of claim 3, further comprising:
receiving corrective content from the shared-robot controller; and
incorporating the corrective content into the robot to obtain a corrected robot.

5. The robot of claim 4, wherein the functional capability comprises a software capability, and wherein the corrective content comprises updated software, the updated software, when incorporated into the robot, fulfilling the functional capability.

6. The robot of claim 4, wherein the functional capability comprises a hardware capability, and wherein the corrective content further comprises a hardware item configured for attachment to the robot, the hardware item, when attached, fulfilling the functional capability.

7. The robot of claim 6, wherein the self-evaluation result comprises a functional deficiency, and wherein incorporation of the hardware item into the robot provides new functionality addressing the functional deficiency.

8. The robot of claim 1, wherein performance of the corrective action further comprises:
receiving, by the processing system, maintenance service via a first responder robot deployed by the shared-robot controller.

9. The robot of claim 1, wherein the performing the corrective action further comprises:
identifying a shared resource item according to the deficiency;
obtaining the shared resource item; and
incorporating the shared resource item into the robot to obtain an incorporated resource configured to resolve the deficiency.

10. The robot of claim 9, wherein the shared resource item is a software resource item, and wherein the obtaining the shared resource item further comprise:
identifying the software resource item within a software resource repository; and
obtaining the software resource item from the software resource repository maintained by one of the shared-robot controller, the shared plurality of robots, or a combination of the shared-robot controller and at least one robot of the shared plurality of robots.

11. The robot of claim 9, wherein the shared resource item is a hardware resource item, and wherein the obtaining the shared resource item further comprise:
identifying the hardware resource item within a hardware resource repository; and
obtaining the hardware resource item from the hardware resource repository maintained by one of the shared-robot controller, the shared plurality of robots, or a combination of the shared-robot controller and at least one robot of the shared plurality of robots.

12. A method, comprising:
determining, by a processing system including a processor of a robot of a shared plurality of robots, a condition of the robot to obtain an auto determined result;
identifying, by the processing system, a corrective action responsive to the auto determined result indicating a deficiency;
determining, by the processing system, whether the robot is configured to perform the corrective action;
responsive to the determining indicating the robot is configured to perform the corrective action, performing, by the processing system, the corrective action; and
responsive to the determining indicating the robot is not configured to perform the corrective action:
originating, by the processing system, a message that requests assistance to perform the corrective action; and
providing, by the processing system, the message to a shared-robot controller, prompting the shared-robot controller to initiate performance of the corrective action.

13. The method of claim 12, wherein the performing the corrective action further comprises:
identifying, by the processing system, a shared resource item according to the deficiency;
obtaining, by the processing system, the shared resource item; and
incorporating, by the processing system, the shared resource item into the robot to obtain an incorporated resource configured to resolve the deficiency.

14. The method of claim 13, wherein the shared resource item is a software resource item, and wherein the obtaining the shared resource item further comprise:
identifying, by the processing system, the software resource item within a software resource repository; and
obtaining, by the processing system, the software resource item from the software resource repository maintained by one of the shared-robot controller, the shared plurality of robots, or a combination of the shared-robot controller and at least one robot of the shared plurality of robots.

15. The method of claim 13, wherein the shared resource item is a hardware resource item, and wherein the obtaining the shared resource item further comprise:

identifying, by the processing system, the hardware resource item within a hardware resource repository; and requesting, by the processing system, delivery to the robot of the hardware resource item from the hardware resource repository maintained by one of the shared-robot controller, the shared plurality of robots, or a combination of the shared-robot controller and at least one robot of the shared plurality of robots.

16. The method of claim 12, wherein the robot comprises a virtual entity.

17. The method of claim 16, wherein the virtual entity is operational within a virtual reality environment.

18. A non-transitory, machine-readable medium, comprising executable instructions that, when executed by a processing system including a processor of a robot, facilitate performance of operations, the operations comprising:

determining, by the robot of a plurality of robots, a condition of the robot to obtain a determined result;

identifying a corrective plan responsive to the determined result indicating a deficiency;

determining whether the robot is configured to perform the corrective plan;

responsive to the determining indicating the robot is configured to perform the corrective plan, executing the corrective plan; and responsive to the determining indicating the robot is not configured to perform the corrective plan, requesting assistance of a robot controller to initiate performance of the corrective plan.

19. The non-transitory, machine-readable medium of claim 18, wherein the robot is in communication with a wide area network, and wherein the robot controller is implemented at least partially within an edge network node of the wide area network.

20. The non-transitory, machine-readable medium of claim 19, wherein the executing the corrective plan comprises utilizing resources of the edge network node.

* * * * *